United States Patent [19]
Chujo et al.

[11] Patent Number: 5,195,365
[45] Date of Patent: Mar. 23, 1993

[54] DEVICE FOR DETECTING COMBUSTION PRESSURE OF AN INTERNAL COMBUSTION ENGINE

[75] Inventors: Yoshiki Chujo, Mishima; Masato Sahashi, Susono; Koji Tsukada, Seto; Yutaka Nonomura, Nagoya, all of Japan

[73] Assignee: Toyota Jidosha Kabushiki Kaisha, Toyota, Japan

[21] Appl. No.: 748,698

[22] Filed: Aug. 22, 1991

[30] Foreign Application Priority Data

Aug. 24, 1990 [JP] Japan ................................. 2-87848
Aug. 24, 1990 [JP] Japan ................................. 2-87849
Aug. 24, 1990 [JP] Japan ................................. 2-87850
Aug. 24, 1990 [JP] Japan ................................. 2-87853

[51] Int. Cl.⁵ ............................................ G01M 15/00
[52] U.S. Cl. ............................................ 73/115
[58] Field of Search .......... 73/115, 708, 714, 717–721, 73/723–728, 756, 35

[56] References Cited

U.S. PATENT DOCUMENTS

| 3,939,703 | 2/1976 | Heggie | 73/115 |
| 4,561,401 | 12/1985 | Hata et al. | 123/486 |
| 4,686,861 | 8/1987 | Morii | 73/115 |
| 5,066,023 | 11/1991 | Ma | 73/35 |
| 5,076,103 | 12/1991 | Lager et al. | 73/708 |

FOREIGN PATENT DOCUMENTS 0157629 6/1990 Japan ................................. 73/115

Primary Examiner—Robert Raevis
Attorney, Agent, or Firm—Kenyon & Kenyon

[57] ABSTRACT

A device for detecting a pressure in a combustion chamber comprises a combustion pressure sensor arranged in a cylinder head gasket so that a pressure detecting surface of the sensor is disposed substantially in parallel to a surface of a cylinder head or a cylinder block, and a pressure inlet is provided above the pressure detecting surface to introduce the combustion pressure to the pressure detecting surface. Due to the position of the pressure inlet above the pressure detecting surface, the tightening force of cylinder head bolts is not applied to the pressure detecting surface of the sensor, and thus the reliability of the pressure detection is improved.

13 Claims, 6 Drawing Sheets

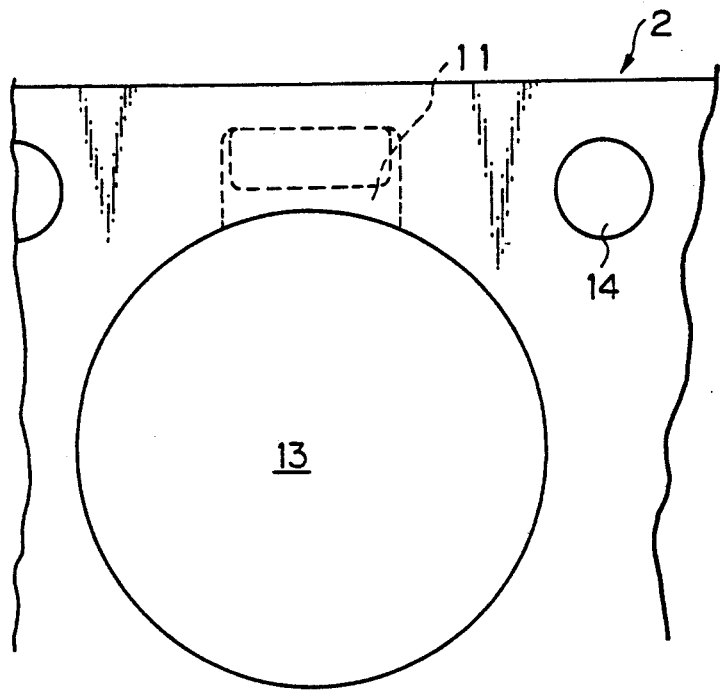
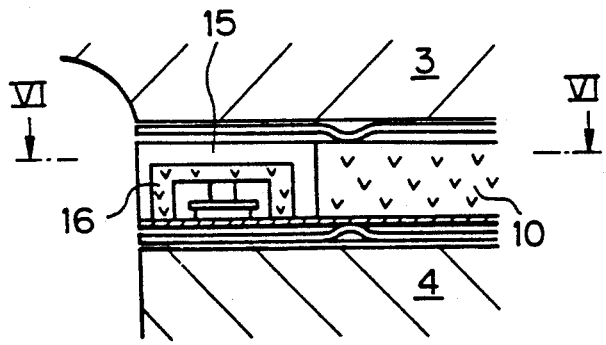
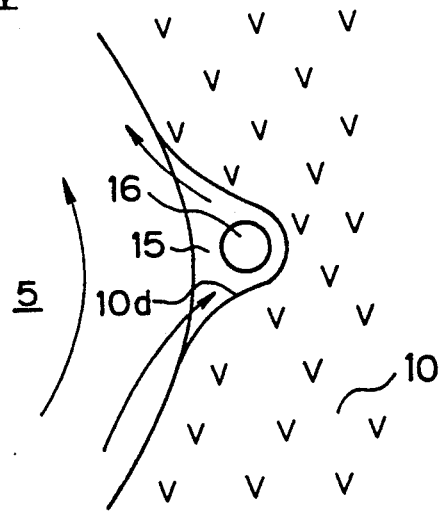

DEVICE FOR DETECTING COMBUSTION PRESSURE OF AN INTERNAL COMBUSTION ENGINE

BACKGROUND OF THE INVENTION

1. Field of the Invention

The present invention relates to a device for detecting a pressure in a combustion chamber of an internal combustion engine.

2. Description of the Related Art

Currently, in an internal combustion engine such as an automobile engine, the driving conditions thereof are controlled electrically. For example, when suitably controlling an ignition timing to prevent knocking, it is necessary to detect a pressure in the combustion chamber, called "a combustion pressure" hereinafter, with a high accuracy.

Among the conventional devices for detecting the combustion pressure, Japanese Unexamined Utility Model Publication No. 58-146941 discloses a device in which an annular piezoelectric sensor is arranged inside of a cylinder head gasket, i.e., on a combustion chamber side thereof, and a change of distance between a cylinder head and the cylinder head gasket due to a combustion is detected by the piezoelectric sensor, to thereby calculate the combustion pressure.

In the above device, the cylinder head gasket equipped with the piezoelectric sensor is tightened between the cylinder head and the cylinder block by bolts passing therethrough, therefore, in such a construction, if the cylinder head is displaced by a combustion or explosion in the combustion chamber, the piezoelectric sensor will be bent to thereby generate an electric charge, and the combustion pressure can be obtained by detecting the electric charge. Nevertheless, since a tightening force of the bolts varies widely in practice, the output characteristics of the sensor are influenced by the variations of the tightening force, and thus the accuracy of the detection of the combustion pressure is lowered.

SUMMARY OF THE INVENTION

An object of the present invention is to provide a device including means for detecting a combustion pressure, in which outputs of the detecting means are not influenced by the tightening force of the bolts.

Therefore, according to the present invention, there is provided a device for detecting a combustion pressure in a combustion chamber of an internal combustion engine, said device comprising:

means for detecting the combustion pressure, said detecting means being provided with a pressure sensitive surface and being arranged in a cylinder head gasket so that said pressure sensitive surface is disposed substantially in parallel to either a surface of a cylinder head, said surface coming into contact with said cylinder head gasket, or a surface of a cylinder block, said surface coming into contact with said cylinder head gasket, and a pressure inlet arranged above said pressure sensitive surface to introduce the combustion pressure in said combustion chamber into said pressure sensitive surface of said detecting means.

The present invention will be more fully understood from the description of the preferred embodiments thereof set forth below, together with the accompanying drawings.

BRIEF DESCRIPTION OF THE DRAWINGS

In the drawings:

FIG. 4 is a partial plan view of a gasket showing a modification of a pressure inlet according to the first embodiment of the invention;

FIG. 5 is a longitudinal sectional view of the device for detecting a combustion pressure according to a second embodiment of the invention;

FIG. 6 is a partial sectional view taken along the line VI—VI of FIG. 5;

DESCRIPTION OF THE PREFERRED EMBODIMENTS

Figure 1:
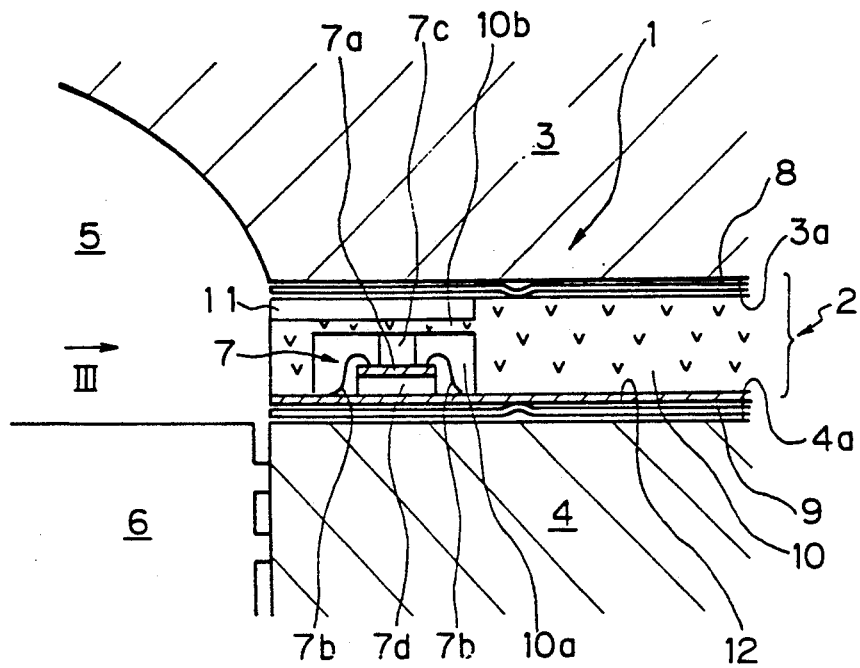
FIG. 1 is a longitudinal sectional view of a device for detecting a combustion pressure according to a first embodiment of the invention.

FIG. 1 shows a device for detecting a pressure in a combustion chamber of an internal combustion engine, in accordance with a first embodiment of the present invention. In FIG. 1, a device 1 for detecting a pressure is arranged in a cylinder head gasket 2 of the engine, wherein 3 is a cylinder head mounted on the gasket 2 and 4 is a cylinder block on which the gasket 2 is arranged. Reference numeral 5 designates a combustion chamber defined by the above elements, in which a piston 6 is reciprocated.

Provided in the cylinder head gasket 2 is a pressure sensor 7 which detects the pressure in the combustion chamber 5 and constitutes an essential component of the present device 1. This will be referred to as the combustion pressure sensor 7 hereinafter.

As shown in the figure, the cylinder head gasket 2 comprises an upper sheet 8 of metal, a lower sheet 9 of metal and an intermediate sheet 10, which may be of metal, positioned therebetween, and the combustion pressure sensor 7 is accommodated and enclosed in a cavity 10a formed in the above intermediate sheet 10.

Furthermore, above the cavity 10a and in the intermediate sheet 10, a pressure inlet 11 is defined by the upper plate 8 and an upper wall 10b of the cavity 10a. The upper wall 10b operates as a diaphragm plate or a pressure sensitive surface of the combustion pressure sensor 7. To detect the combustion pressure, this pressure inlet 11 introduces a gas pressure generated in the combustion chamber 5 to an inside of the intermediate sheet 10.

The combustion pressure sensor 7 comprises a plate-shaped sensing element 7a providing a detecting part of the sensor 7, two leads 7b extending from the element 7a, an insulator 7c mounted on the element 7a, and a pedestal 7d for the element 7a. The leads 7b are embedded in an insulating layer 12 interposed between the lower sheet 9 and the intermediate sheet 10, and finally, electrically connected to a pressure arithmetic circuit or a computer (not shown).

To use a piezoresistance effect, the sensing element 7a can be either a semiconductor element such as a silicon element, for detecting the change of pressure as the change of voltage generated, or a piezoelectric element such as PZT (Lead Zirconate Titanate) and PT to detect it as the change of charge generated.

The insulator 7c can be made of ceramic materials such as Zirconia and Alumina. Because it is in contact with a back of upper wall 10b, the insulator 7c serves to transmit the combustion pressure introduced into the pressure inlet 11 to the sensing element 7a.

The upper wall 10b, which provides a pressure sensitive surface of the combustion pressure sensor 7, by operatively connecting with the sensing element 7a through the intermediary of the insulator 7c, is formed to extend in parallel to a surface 3a of the cylinder head 3 or a surface 4a of the cylinder block 4, both of which come into contact with the cylinder, head gasket 2.

Because the pressure pressure sensitive surface of the sensor is formed in a transverse direction of the gasket 2, as described above, an area of the surface itself can be increased, compared to when the pressure sensitive surface is formed in a direction perpendicular to the surface 3a or 4a, to thereby improve an accuracy of the detection of the combustion pressure.

Figure 2:
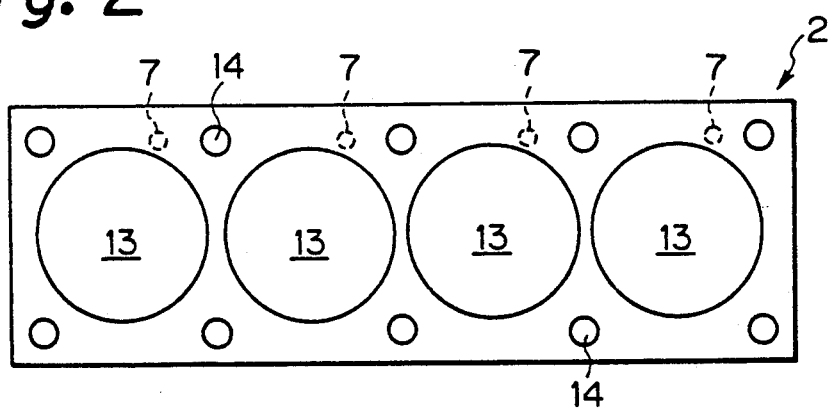
FIG. 2 is a plan view of a cylinder head gasket having the device shown in FIG. 1 therein.

FIG. 2 shows the cylinder head gasket 2 alone, including the afore-mentioned combustion pressure sensors 7. In FIG. 2, reference numerals 13 designate cylinder bores formed in the gasket 2, and reference numerals 14 are holes through which cylinder head bolts (not shown) pass. In this figure, dashed circular lines designate parts wherein the combustion sensors are built-in. In addition, FIG. 3 shows a view of the part wherein the combustion pressure sensor 7 shown in FIG. 1 is to be built-in from the combustion chamber side.

Figure 3:
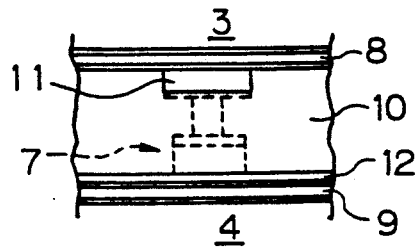
FIG. 3 is a schematic view of the device, seen in a direction of an arrow III shown in FIG. 1.

FIG. 4 shows a variant of the above-mentioned pressure inlet, and shows a new pressure inlet 11 formed in the cylinder head gasket 2 so as to be larger than the previous pressure inlet 11 shown in FIG. 3, to thereby increase the accuracy of the detection of the combustion pressure.

FIGS. 5 and 6 show a second embodiment of the present invention. Note, in this embodiment, as well as in embodiments described hereinafter, elements similar to those of the first embodiment shown in FIGS. 1 to 3 are indicated by the same reference numerals, and elements corresponding to those of the first embodiment are indicated by the same reference numerals suffixed with a prime.

The pressure sensitive surface of the combustion sensor 7 is constructed by a part of the intermediate sheet 10 in the first embodiment, but the surface in accordance with this embodiment is constructed by a cylindrical-shaped cover 16 having an opening at one end thereof. According to this embodiment, a part of the intermediate sheet 10 is cut away to provide a recess 15 for mounting the sensor 7, which provides the pressure inlet and which is defined by a smooth boundary line as shown in FIG. 6. Then, in the recess 15, the combustion pressure sensor 7 is arranged on the lower sheet 9, and the cover 16 is put on the sensor 7 to be in contact therewith. Namely, according to this embodiment, due to the smoothness of boundary line defining the recess 15, a part of a swirl generated in the combustion chamber 5 can enter the recess 15 and pass therethrough smoothly, along the line of the arrows shown in FIG. 6, and thus deposits of, e.g., carbon, on the pressure sensitive surface can be prevented to ensure that the accuracy of the detection of the pressure does not decrease with the passage of time. Note, in connection with the second embodiment mentioned above, a side surface 10d defining the recess 15 or the cover 16 may have a coating material such as Teflon (registered trademark) with a high surface tension, coated thereon, to further prevent an adhering of such deposits.

Figure 7:
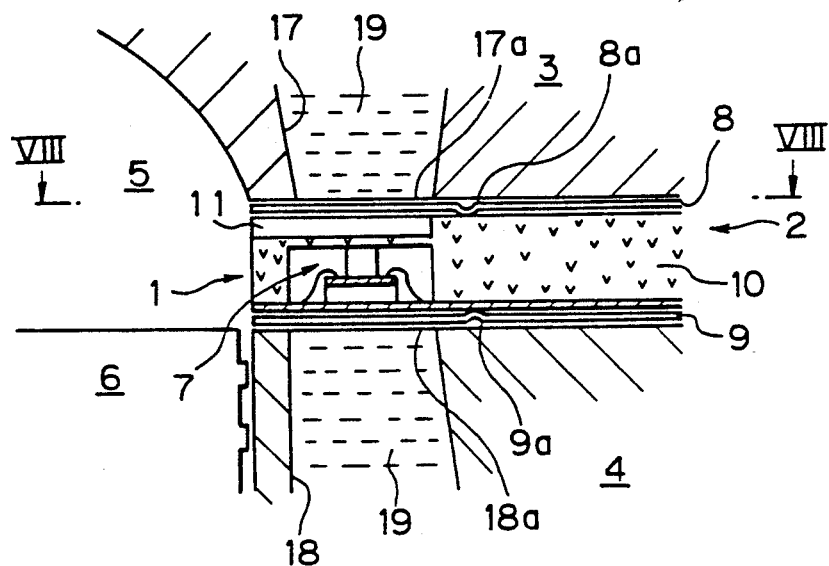
FIG. 7 is a longitudinal sectional view of the device for detecting a combustion pressure according to a third embodiment of the invention.
Figure 8:
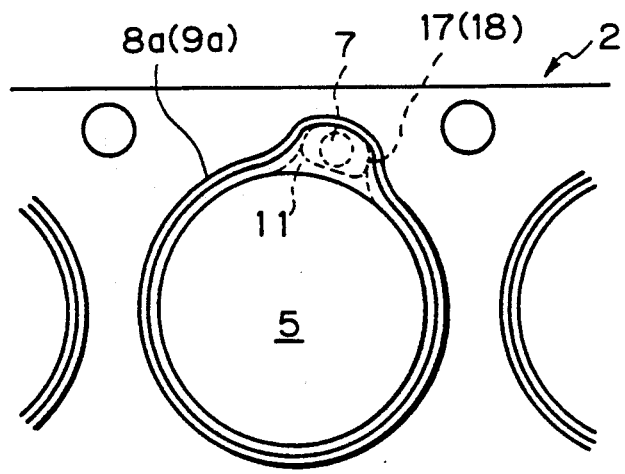
FIG. 8 is a partial sectional view taken along the line VIII—VIII of FIG. 7.

FIGS. 7 and 8 show a third embodiment of the present invention.

Referring to FIG. 7 construction of the device in accordance with this embodiment is substantially identical to that of the first embodiment shown in FIG. 1, except for an environment adjacent to the combustion pressure sensor.

Namely, according to this embodiment, the sensor 7 is arranged between an opening end of a cooling water passage 17 formed in the cylinder head 3 and an opening end of a cooling water passage 18 formed in the cylinder block 4, to be aligned with the passage 17.

In this configuration, the opening end 17a of the passage 17 is sealingly closed by the upper sheet 8 of the gasket 2 on one hand, and the opening end 18a of the passage 18 is sealingly closed by the lower sheet 9 on the other hand. Therefore, although there is no flow of cooling water 19 from the passage 17 to the passage 18, or vice versa, at this position, the sensor 7 can be effectively cooled by contact between the cooling water 19 and the upper and lower sheets 8 and 9, so that the temperature of the sensor 7 can be maintained at a substantially constant value under which the outputs of the sensor 7 are stable, regardless of the heat generated in the combustion chamber 5.

Regarding the construction of the gasket 2 in accordance with this embodiment, as shown in FIG. 8, preferably beads 8a and 9a provided on the sheets 8 and 9, respectively, are formed in such a manner that they go around the outside of the sensor 7. This is because, if the conventional gasket with a circular bead formed around cylinder bore is used in this embodiment, the sensor will be positioned outside the bead, and thus the length of the pressure inlet 11 must be increased correspondingly and therefore, the combustion pressure may not be accurately detected since vibrations of an elongated air column existing in the pressure inlet 11 have an adverse effect on a practical value of the combustion pressure.

According to this embodiment, cooling the sensor 7 with the cooling water flowing in an engine body enables the output characteristics of the combustion pressure sensor to be maintained in a stable condition, regardless of the temperature of the combustion chamber.

Figure 9:
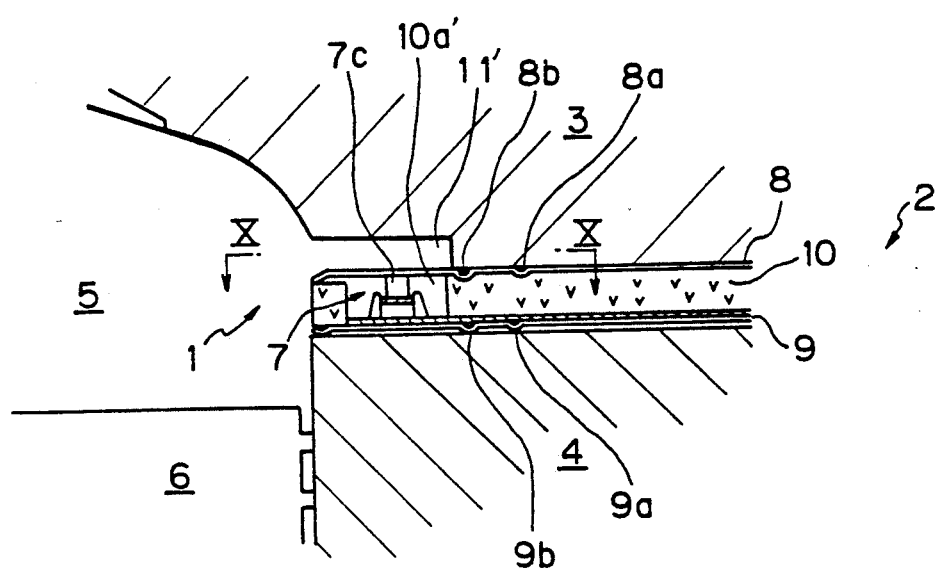
FIG. 9 is a longitudinal sectional view of the device for detecting a combustion pressure according to a fourth embodiment of the invention.
Figure 10:
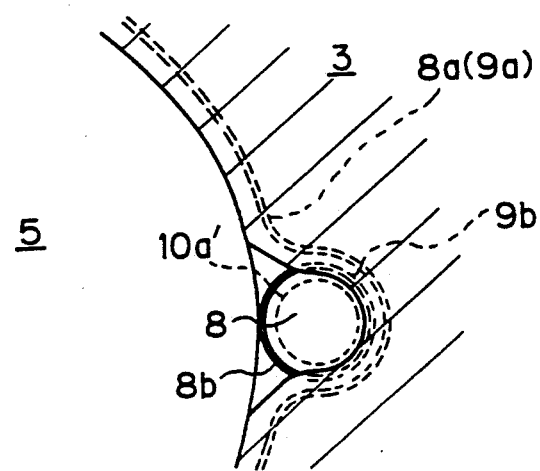
FIG. 10 is a partial sectional view taken along the line X—X of FIG. 9.

FIGS. 9 and 10 show a fourth embodiment of the present invention.

Contrary to the previous embodiments, wherein the pressure sensitive surface of the combustion pressure sensor 7 is constructed by a part of the intermediate sheet 10 or the cover 16, the surface in accordance with this embodiment is provided by bringing the upper sheet 8 into contact with the insulator 7c of the combustion pressure sensor 7. Therefore, in this configuration, a pressure inlet 11' defined by a smooth boundary line, as shown in FIG. 10, is formed in a portion of the cylinder head 3 above the upper plate 8.

According to this embodiment, since a cavity 10a' for accommodating the sensor 7 can be easily provided by only boring the intermediate sheet 10, it is easy to produce the device in accordance with this embodiment. Furthermore, according to this embodiment, since there is no need to provide the intermediate sheet with the pressure inlet, the thickness of the gasket 2 itself can be reduced to thus minimize a quench area wherein a flame in the combustion chamber 5 cannot be transmitted, and whereby a discharge of unburned hydrocarbon (HC) can be restrained.

Referring to FIG. 10, dotted lines (partially, solid lines) illustrate beads 8a, 8b, 9a and 9b formed on the sheets 8 and 9 for a gas sealing.

Similar to the beads in the third embodiment shown in FIG. 8, the beads 8a and 9a of this embodiment are formed in such a manner that they surround the combustion chamber 5, and surround the outside of the cavity 10a'. On the other hand, the beads 8b and 9b are formed so as to surround the cavity 10a, inside the beads 8a and 9a, respectively. Due to the double provision of a gas seal around the cavity 10a', it is possible to make the cavity 10a' gas tight so that the combustion gas cannot enter thereto.

Figure 11:
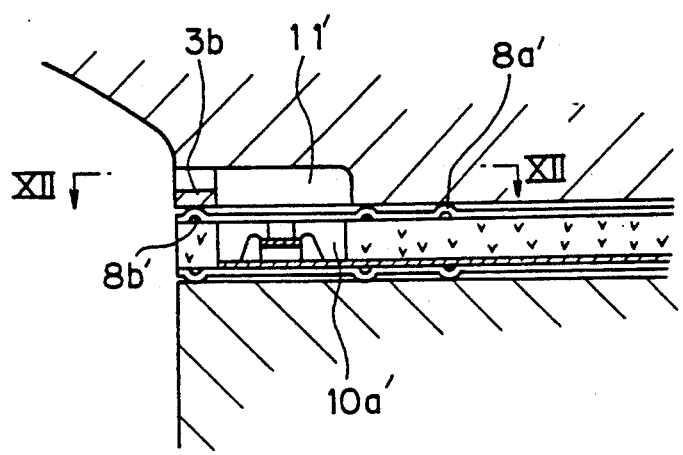
FIG. 11 is a longitudinal sectional view of the device, showing a modification of the pressure inlet of FIG. 9.
Figure 12:
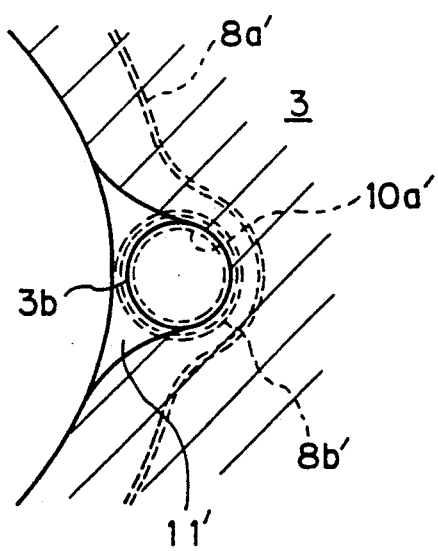
FIG. 12 is a partial sectional view taken along the line XII—XII.

In modifications to increase the gas-tightness, a laser welding may be applied between the intermediate sheet 10 and the upper sheet 8 about the cavity 10a' or, as shown in FIGS. 11 and 12, a pressure inlet may be formed in such a manner that a part 3b of the cylinder head 3 is left, to press the bead 8b' downward.

Figure 13:
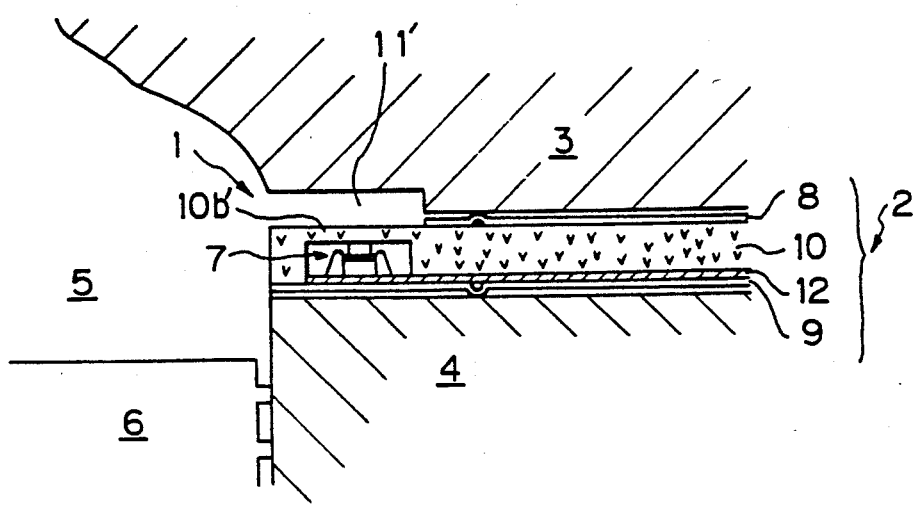
FIG. 13 is a longitudinal sectional view of the device, showing a modification of the fourth embodiment shown in FIGS. 9 and 10.

FIG. 13 shows a modification of the fourth embodiment shown in FIGS. 9 and 10, in which a part 10b' of the intermediate sheet 10 constitutes the pressure sensitive surface of the sensor 7 and a part of the upper sheet 8 is omitted corresponding to the shape of the pressure inlet 11'. The operation thereof is substantially the same as that of the fourth embodiment.

Figure 14:
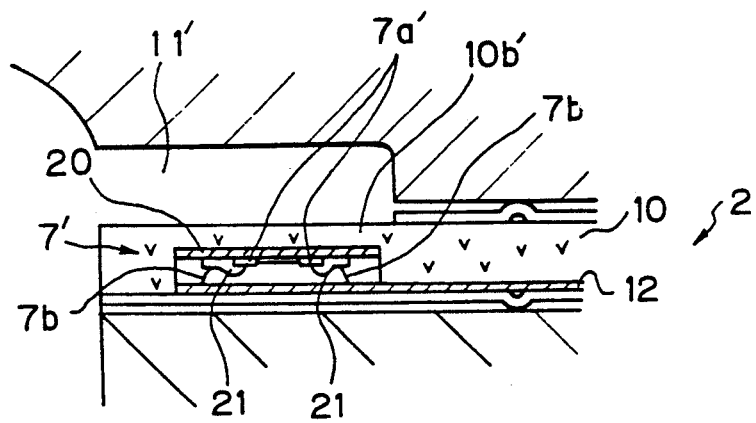
FIG. 14 is a longitudinal sectional view of the device for detecting a combustion pressure according to a fifth embodiment of the invention.

FIG. 14 shows a fifth embodiment in which a construction of a combustion pressure sensor is basically different from those in the afore-mentioned embodiments.

Namely, all of the combustion pressure sensors in the previous embodiments detect a pressure imparted to the sensing element, but the sensor 7' in accordance with this embodiment comprises a film-type strain gauge 7a' which is pasted on a ceiling surface of the upper wall 10b' via an insulating layer 20, two electrode layers 21, each provided at both ends of the strain gauge 7a', and two leads 7b each connected to each electrode layer 21. In this configuration, the strain gauge 7a' detects a deformation of the upper wall 10b' caused by the combustion pressure, to thereby calculate the actual combustion pressure, using a conversion formula (or a conversion map) from strains into combustion pressures, which are pre-obtained experimentally. According to this embodiment, the construction of the combustion pressure sensor itself can be simplified, to thereby make it easy to arrange the sensor element in the intermediate sheet of the gasket.

Figure 15:
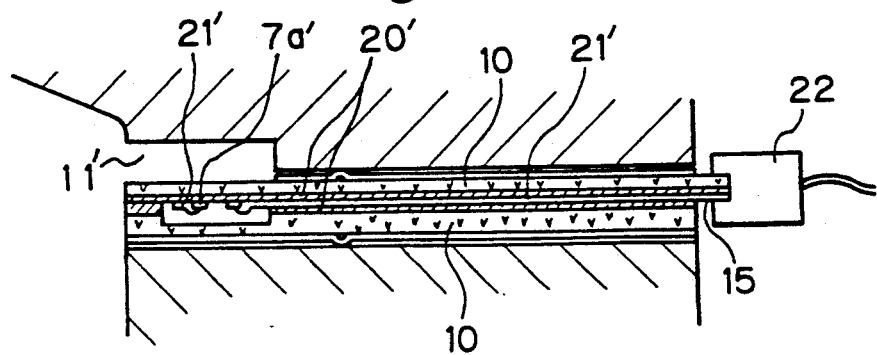
FIG. 15 is a longitudinal sectional view of the device, showing a modification of the fifth embodiment shown in FIG. 14.

FIG. 15 shows a modification of the fifth embodiment of FIG. 14, in which the strain gauge 7a' is also used as the sensing element.

In this configuration, an electrode layer 21' is horizontally extended in the intermediate sheet 10, and two leads (not shown) are incorporated in the layer 21'. The electrode layer 21' is laminated on both surfaces by two insulating layers 20', and electrically connected to a connector 22 through a computer (not shown).

As described above, according to the present invention, by constructing the device in such a manner that the combustion pressure generated in the combustion chamber can be introduced through the pressure inlet to the combustion pressure sensitive surface, and by positioning the pressure sensitive surface under the pressure inlet, the tightening force of cylinder head bolts is not applied on the pressure sensitive surface, and thus the pressure detection of the present invention can reliably detect a pressure, regardless of the bolt tightening force.

Although embodiments of the present invention have been described herein with reference to the attached drawings, many modifications and changes may be made by those skilled in this art without departing from the scope of the invention.

We claim:

1. A device for detecting a combustion pressure in a combustion chamber of an internal combustion engine, said device comprising:

means for detecting the combustion pressure, said detecting means being provided with a pressure sensitive surface and being arranged in a cylinder head gasket so that said pressure sensitive surface is disposed substantially parallel to either a surface of a cylinder head, said cylinder head surface coming into contact with said cylinder head gasket, or a surface of a cylinder block, said cylinder block surface coming into contact with said cylinder head gasket, and a fluid pressure inlet arranged adjacent to said pressure sensitive surface to introduce the combustion pressure in said combustion chamber into contact with said pressure sensitive surface of said detecting means.

2. A device according to claim 1, wherein said detecting means comprises a pressure sensor for detecting a combustion pressure applied to said pressure sensitive surface.

3. A device according to claim 2, wherein said fluid pressure inlet is formed in said cylinder head gasket.

4. A device according to claim 1, wherein said detecting means comprises a strain gauge for detecting a deformation of said sensitive surface due to the combustion pressure.

5. A device according to claim 2 or 4, wherein said fluid pressure inlet is formed in said cylinder head.

6. A device according to claim 2 or 4, wherein said cylinder head gasket comprises a plurality of sheets of metal.

7. A device according to claim 6, wherein said pressure sensitive surface is constructed by said cylinder head gasket.

8. A device according to claim 7, wherein said cylinder head gasket further comprises at least one insulating layer arranged between said sheets of metal.

9. A device according to claim 8, further comprising two leads electrically connected to said detecting means, wherein said leads are embedded in said insulating layer.

10. A device according to claim 9, wherein said sheets of metal comprise three laminated sheets of metal.

11. A device according to claim 10, further comprising an electrode layer integral with two leads connected to said detecting means, wherein said electrode layer is laminated on both sides by said insulating layers and positioned in an intermediate sheet of said three sheets of metal cylinder head.

12. A device according to claim 10, wherein said detecting means is positioned in a cavity formed in an intermediate sheet of said three laminated sheets of metal, and wherein an upper sheet of said laminated sheet, which faces to said cylinder head, is provided as said pressure sensitive surface of said pressure detection means.

13. A device according to claim 1, wherein said detecting means is arranged in the vicinity of an end of a cooling-water passage formed in said cylinder head or said cylinder block.

* * * * *

UNITED STATES PATENT AND TRADEMARK OFFICE
CERTIFICATE OF CORRECTION

PATENT NO. : 5,195,365
DATED : March 23, 1993
INVENTOR(S) : Chujo et al.

It is certified that error appears in the above-indentified patent and that said Letters Patent is hereby corrected as shown below:

On the title page, change:

"[73] Assignee: Toyota Jidosha Kabushiki Kaisha, Toyota, Japan"

to:--[73] Assignees: Toyota Jidosha Kabushiki Kaisha, Aichi, Japan and Kabushiki Kaisha Toyota Chuo Kenkyusho, Aichi, Japan --

Signed and Sealed this

First Day of April, 1997

Attest:

BRUCE LEHMAN

Attesting Officer

Commissioner of Patents and Trademarks